US009657796B2

(12) United States Patent
Lv et al.

(10) Patent No.: US 9,657,796 B2
(45) Date of Patent: May 23, 2017

(54) FREQUENCY-VARIABLE HAND RUBBED-TYPE MOTOR SPEED REDUCTION CLUTCH APPARATUS, AND WASHING MACHINE

(71) Applicants: HAIER GROUP CORPORATION, Qingdao, Shandong (CN); QINGDAO HAIER WASHING MACHINE CO., LTD., Qingdao, Shandong (CN)

(72) Inventors: Peishi Lv, Shandong (CN); Lin Yang, Shandong (CN); Gangjin Zhang, Shandong (CN); Yun Tian, Shandong (CN); Xiaofeng Hao, Shandong (CN)

(73) Assignees: HAIER GROUP CORPORATION, Qingdao, Shandong (CN); QINGDAO HAIER WASHING MACHINE CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/043,070

(22) Filed: Feb. 12, 2016

(65) Prior Publication Data
US 2016/0201747 A1 Jul. 14, 2016

Related U.S. Application Data

(63) Continuation of application No. PCT/CN2013/090073, filed on Dec. 20, 2013.

(30) Foreign Application Priority Data

Aug. 15, 2013 (CN) .......................... 2013 1 0356422

(51) Int. Cl.
*F16D 67/06* (2006.01)
*D06F 37/30* (2006.01)
(Continued)

(52) U.S. Cl.
CPC .......... *F16D 67/06* (2013.01); *D06F 37/206* (2013.01); *D06F 37/30* (2013.01); *H02K 7/10* (2013.01)

(58) Field of Classification Search
None
See application file for complete search history.

(56) References Cited

U.S. PATENT DOCUMENTS 2,871,689 A * 2/1959 Fields .................... D06F 13/08
68/131
3,783,652 A * 1/1974 Archbold ................ D06F 37/40
68/23.7
(Continued)

FOREIGN PATENT DOCUMENTS

CN 2443980 Y 8/2001
CN 2446143 Y 9/2001
(Continued)

OTHER PUBLICATIONS

State Intellectual Property Office of the P.R. China (ISR/CN), "International Search Report for PCT/CN2013/090073", China, May 23, 2014.

*Primary Examiner* — Colby M Hansen
(74) *Attorney, Agent, or Firm* — Tim Tingkang Xia, Esq.; Locke Lord LLP (57) ABSTRACT

A frequency-variable hand rubbed-type motor speed reduction clutch apparatus, and a washing machine. The clutch apparatus includes: an input shaft (5) connected to a motor rotor (1); a dehydration shaft (18); and a clutch apparatus housing (8) in which the input shaft (5) and the dehydration shaft (18) are mounted. A braking wheel (12) and a braking belt (15) fitted to the braking wheel (12) are disposed on the dehydration shaft (18). A dehydration shaft sleeve (20) rotating together with the input shaft (5) is mounted on the input shaft (5). A clutch shaft sleeve (3) sliding up and down, and engaging with or separated from the dehydration shaft sleeve (20) is mounted on the dehydration shaft (18). The (Continued)

braking belt (15) and the clutch shaft sleeve (3) are separately connected to a traction motor (11) by means of a control apparatus.

13 Claims, 3 Drawing Sheets

(51) Int. Cl.
*H02K 7/10* (2006.01)
*D06F 37/20* (2006.01)

(56) References Cited

U.S. PATENT DOCUMENTS

| | | | | |
|---|---|---|---|---|
| 4,791,691 A * | 12/1988 | Fukuzawa | ............ | D06F 35/006 68/133 |
| 5,950,459 A * | 9/1999 | Takagi | ............ | D06F 13/02 68/134 |
| 2015/0240404 A1* | 8/2015 | Kim | ............ | D06F 33/02 68/12.05 |

FOREIGN PATENT DOCUMENTS

| | | | |
|---|---|---|---|
| CN | 2455747 Y | 10/2001 | |
| CN | 2568683 Y | 8/2003 | |
| CN | 102191663 A | 9/2011 | |
| CN | 102277710 A | 12/2011 | |
| CN | 202157204 U | 3/2012 | |
| CN | 102787468 A | 11/2012 | |
| CN | 202989576 U | 6/2013 | |
| CN | 203021794 U | 6/2013 | |

\* cited by examiner

FREQUENCY-VARIABLE HAND RUBBED-TYPE MOTOR SPEED REDUCTION CLUTCH APPARATUS, AND WASHING MACHINE

CROSS-REFERENCE TO RELATED APPLICATIONS

This application is a continuation application of International Patent Application No. PCT/CN2013/090073, filed Dec. 20, 2013, which itself claims the priority to Chinese Patent Application No. 201310356422.8 filed Aug. 15, 2013 in the State Intellectual Property Office of P.R. China, which are hereby incorporated herein in their entireties by reference.

FIELD OF THE INVENTION

The present invention relates generally to the field of washing machines, and more particularly to a frequency-variable hand rubbed-type motor speed reduction clutch apparatus and a washing machine.

BACKGROUND OF THE INVENTION

In the prior art, such as the vast majority of washing machines newly released in the market, a washing machine speed reduction clutch and a single-phase asynchronous motor are abreast installed, and transmission is performed by using a belt wheel and a belt. The type of washing machine speed reduction clutches are low in efficiency, large in noise, and relatively poor in practicability; therefore, related technicians propose a technical solution in which a motor and a clutch are perpendicularly and concentrically installed. For example, in Chinese Utility Model Patent No. ZL00260194.x, a single-bearing electromotor with a cup-shaped rotor for a full-automatic washing machine and a dedicated clutch apparatus for the same are disclosed. In the patent, an ordinary single-phase asynchronous motor and a washing machine speed reduction clutch are concentrically installed, thereby improving transmission efficiency. However, in the technical solution of the patent, a single-phase asynchronous motor originally installed beside a washing machine speed reduction clutch is only simply directly perpendicularly installed below the clutch; because efficiency of the motor is not considerably improved, the washing manner is single, functions are simple, installation and connection thereof are complex, and the precision requirement is high, mass production is not suitable, and the washing machine cannot implement frequency-variable rubbing and kneading washing, or frequency-variable multi-speed dehydration. In another example, Chinese Patent No. ZL00234747.4 discloses a washing machine speed reduction clutch directly driven by a brushless motor. In the patent, a brushless motor is used for directly driving a washing machine clutch, so as to resolve a problem of low efficiency of a single-phase asynchronous motor, and improve energy efficiency. However, the motor of the structure is complex in connection, and can only implement an ordinary washing manner, connection parts of main components are relatively large in quantity, requirements on clutch installation precision are excessively high, and a disadvantage of a high fault rate exists in the motor, and therefore the technical solution of the patent is not suitable for mass production.

For example, in Chinese Patent Application No. CN201120257375.8, a washing machine bionic hand rubbed frequency-variable speed reduction clutch includes a lower casing and an input shaft that are assembled, a direct current brushless motor stator is installed in the lower casing, an end portion of the input shaft is connected to a direct current brushless motor outer rotor, the direct current brushless motor stator is located in a cavity of the direct current brushless motor outer rotor, and the input shaft is assembled with a sliding clutch mechanism formed by a shaft sleeve, a clutch shaft, a clutch sliding block and a clutch spring; and the shaft sleeve is sleeved over the input shaft, the clutch shaft is located above the shaft sleeve and is sleeved over the input shaft in a rotatable manner, the shaft sleeve and the clutch shaft are both provided with external peripheral splines, internal peripheral guiding splines that the clutch sliding block is provided with and the external peripheral splines of the shaft sleeve and the clutch shaft are connected in a slidable manner, the clutch spring presses a circular ring boss that the clutch sliding block external is peripherally provided with, and the clutch sliding block is connected to a clutch control mechanism.

In view of the foregoing, the present invention is specifically proposed.

SUMMARY OF THE INVENTION

An objective of the present invention is to provide a frequency-variable hand rubbed-type motor speed reduction clutch apparatus, and to achieve the inventive objective, technical solutions are used as follows:

A frequency-variable hand rubbed-type motor speed reduction clutch apparatus includes: an input shaft connected to a motor rotor, a dehydration shaft, and a clutch apparatus housing in which the input shaft and the dehydration shaft are installed, where a braking wheel and a braking belt fitted to the braking wheel are disposed on the dehydration shaft; a dehydration shaft sleeve rotating together with the input shaft is installed on the input shaft, and a clutch shaft sleeve sliding up and down and engaged with or disengaged from the dehydration shaft sleeve is installed on the dehydration shaft; the braking belt and the clutch shaft sleeve are separately connected to a traction motor by means of a control apparatus; the traction motor generates a first displacement, the first displacement is transmitted by means of the control apparatus and drives the braking belt to move, so that the braking belt changes from grasping the braking wheel to loosening the braking wheel, and the dehydration shaft changes from a braked state to a free rotation state; and the traction motor generates a second displacement, the second displacement is transmitted by means of the control apparatus and drives the clutch shaft sleeve to move, so that the clutch shaft sleeve changes from being disengaged from the dehydration shaft sleeve to engaged with the dehydration shaft sleeve, and the dehydration shaft rotates together with the input shaft.

Further, the control apparatus includes a traction mechanism connected to the traction motor, and a shifting fork mechanism in contact with the clutch shaft sleeve; and a first output end of the traction mechanism is connected to the braking belt, and a second output end of the traction mechanism is connected to the shifting fork mechanism, so as to drive the clutch shaft sleeve to move up and down.

Further, the traction mechanism includes a connection arm and a braking arm; the connection arm is connected to the traction motor to transmit control power, and the connection arm is connected to the braking belt by means of a first output end of the braking arm; and the connection arm is connected to the shifting fork mechanism by means of a second output end of the braking arm.

Further, the shifting fork mechanism includes a compression bar connected to the second output end of the braking arm, and a shifting fork in limited contact with the compression bar; and the shifting fork is in contact with the clutch shaft sleeve, so as to control the clutch shaft sleeve to move up and down.

Further, one end of the connection arm is provided with an installation slot fixedly connected to a displacement output end of the traction motor, and another end of the connection arm is formed by a square through-hole; and the braking arm is installed in the square through-hole.

Further, the braking arm is installed at a lower portion of an installation pin and rotates around the installation pin, and the installation pin is disposed on the housing; and one end of the braking arm is connected to the connection arm, another end of the braking arm is used as the first output end fixedly connected to the braking belt, and the second output end in contact with or disengaged from the compression bar is further disposed on the braking arm.

Further, the braking arm includes a strip bar and a square installation hole provided at an end portion of the braking arm, and the strip bar is connected to the braking arm, so as to generate a displacement under the action of the braking arm. A side wall of the square installation hole is perpendicularly connected to the strip bar, and another side wall opposite to the side wall is formed by a casing pipe. The braking arm may be installed on the installation pin in a rotatable manner by using the side wall formed by the casing pipe. A tensioned third torsional spring is disposed between the braking arm and the installation pin, so as to provide a reset acting force for the braking arm. An end portion of the braking belt goes to the back of the side wall formed by the casing pipe, threads into a square installation through-hole, and is locked and fixed on the side wall of the opposite side, so that the braking belt and the braking arm are fixedly installed, and the square through-hole is used as a first output end. A middle location of the strip bar is provided with a contact screw in contact with or disengaged from the compression bar, and an end portion of the contact screw has a distance from a contact end of the compression bar, so that after the braking arm generates a displacement under the action of the traction motor, the contact screw just contacts the compression bar.

Further, the compression bar is installed at an upper portion of the installation pin and rotates around the installation pin; and one end of the compression bar is in contact with or disengaged from the braking arm, and another end of the compression bar is in contact with the shifting fork.

Further, an installation hole for the compression bar to be installed on the installation pin, and a first blocking sheet and a second blocking sheet that are disposed at two sides of the compression bar and perpendicular to the compression bar are provided on the compression bar. There is a gap between the first blocking sheet and the contact screw of the braking arm, and the second blocking sheet is in contact with the shifting fork. A tensioned second torsional spring is disposed between the compression bar and the installation pin, so as to provide a reset acting force for the compression bar.

Further, the shifting fork is installed on the housing in a vertically rotatable manner; and one end of the shifting fork is provided with a blocking fork that limits sliding of the clutch shaft sleeve, and another end of the shifting fork is provided with a blocking handle in limited contact with the compression bar.

Further, the shifting fork may be installed on a fixing bracket and vertically rotate around the fixing bracket. The fixing bracket is sleeved over the dehydration shaft, and fixedly installed on the housing. The shifting fork is perpendicular to the fixing bracket, and may be installed on the fixing bracket and rotate around the fixing bracket. One end of the shifting fork is provided with a blocking fork that limits downward sliding of the clutch shaft sleeve, and opposite another end of the shifting fork is provided with a blocking handle in fitted contact with a blocking sheet of the compression bar. A tensioned first torsional spring is disposed between the shifting fork and the fixing bracket, so as to provide a reset acting force for the shifting fork.

Further, the shifting fork, the compression bar, and the braking arm are separately connected to corresponding torsional springs providing reset acting forces for the shifting fork, the compression bar, and the braking arm; and the clutch shaft sleeve is in contact with a clutch spring providing a movement acting force for the clutch shaft sleeve.

Further, the clutch shaft sleeve is sleeved over the dehydration shaft, and the dehydration shaft is connected to the clutch shaft sleeve by means of engaged splines.

Further, the clutch shaft sleeve is formed by a shaft sleeve whose internal periphery is provided with splines fitted to the dehydration shaft, and a circle of fixed protrusion horizontally extends outward from the external periphery of the shaft sleeve. A clutch spring having a tensioned force is disposed between the fixed protrusion and the fixing bracket. A lower end portion of the clutch shaft sleeve is axially provided with a circle of spline teeth.

Further, one end of the clutch shaft sleeve and one end of the dehydration shaft sleeve are separately provided with fitted spline teeth, so that the dehydration shaft sleeve and the clutch shaft sleeve are engaged and connected or disengaged.

Further, the dehydration shaft sleeve is sleeved over the input shaft, and the dehydration shaft sleeve is connected to the input shaft by means of engaged splines.

Further, the dehydration shaft sleeve is formed by two segments of shaft sleeves that are coaxial and have different diameters, and whose internal periphery is provided with splines fitted to the input shaft. The upper-segment shaft sleeve is relatively small in outer diameter, and passes through an inner hole of the clutch shaft sleeve and then contacts an end portion of the dehydration shaft. The lower-segment shaft sleeve is relatively large in outer diameter, and an upper end of the lower-segment shaft sleeve is provided with spline teeth fitted to the clutch shaft sleeve, so as to be engaged with or disengaged from the clutch shaft sleeve. The external periphery of the dehydration shaft sleeve is wrapped with a circle of shock absorption pad. The shock absorption pad made of a rubber material is disposed between the clutch shaft sleeve and the motor, so as to reduce an effect of vibration of the motor on the dehydration shaft sleeve.

Further, the fixing bracket, the clutch spring, the clutch shaft sleeve, the dehydration shaft sleeve, a motor stator and the motor rotor are sequentially sleeved over the input shaft, and are installed on the clutch apparatus by using a nut connected to an end portion of the input shaft.

Another objective of the present invention is to provide a washing machine in which any one frequency-variable hand rubbed-type motor speed reduction clutch apparatus described as above is installed, including: an outer bucket and an inner bucket that are installed in a body and an impeller that is disposed in the inner bucket, where the clutch apparatus is fixedly installed on the washing machine, the input shaft is fixedly connected to the impeller of the washing machine by using a speed reduction component inside the speed reduction clutch apparatus, and the dehydration shaft is fixedly connected to the inner bucket of the washing machine.

Further, when the washing machine does not work, the braking belt grasps the braking wheel, the dehydration shaft cannot rotate, and the inner bucket of the washing machine cannot rotate. During washing, the traction motor generates a displacement, and drives the braking belt to loosen the braking wheel, so that the inner bucket generates an inertial movement together with rotation of the impeller. During dehydration, the traction motor generates a displacement in a same direction again, and drives the clutch shaft sleeve to be engaged with the dehydration shaft sleeve, so that the inner bucket and the impeller rotate simultaneously together with the rotor of the motor.

By means of the foregoing technical solution, advantages of the present invention over the prior art lie in that: the clutch shaft sleeve is engaged with or disengaged from the dehydration shaft sleeve by means of splines, so as to achieve an objective of switching between dehydration and washing modes of the washing machine. More particularly, the control apparatus formed by the connection arm, the braking arm, the shifting fork and the clutch spring transfer a controllable traction acting force of the traction motor to the clutch shaft sleeve or the braking belt, so as to implement a fitted action between the clutch shaft sleeve and the braking belt, and achieve an objective that under the action of the clutch shaft sleeve and the braking belt, the dehydration shaft rotates jointly together with the rotor or freely rotates or grasps and does not move. Because in the present invention, the clutch shaft sleeve and the clutch spring are installed in space inside the motor, and compared with the conventional clutch formed by components such as a ratchet wheel, a clutch spring, and a shaft sleeve, the present invention is smaller in volume, and more in compact in installation structure, the height of the motor speed reduction clutch is effectively reduced, and the whole washing capacity of the washing machine may be effectively increased. The present invention is simple in structure and notable in effect, and is suitably popularized and used.

Numeral references of main components: 1—motor rotor, 2—stator, 3—clutch shaft sleeve, 4—nut, 5—input shaft, 6—clutch spring, 7—fixing bracket, 8—housing, 9—first torsional spring, 10—shifting fork, 11—traction motor, 12—braking wheel, 13—compression bar, 14—second torsional spring, 15—braking belt, 16—connection arm, 17—braking arm, 18—dehydration shaft, 19—Hall sensor, 20—dehydration shaft sleeve, 21—shock absorption pad, 22—third torsional spring, 23—spline teeth, 24—first inner splines, 25—second inner splines, and 26—installation pin 26.

DETAILED DESCRIPTION OF THE INVENTION

The present invention is further described in detail with reference to embodiments.

Embodiment 1

Figure 1:
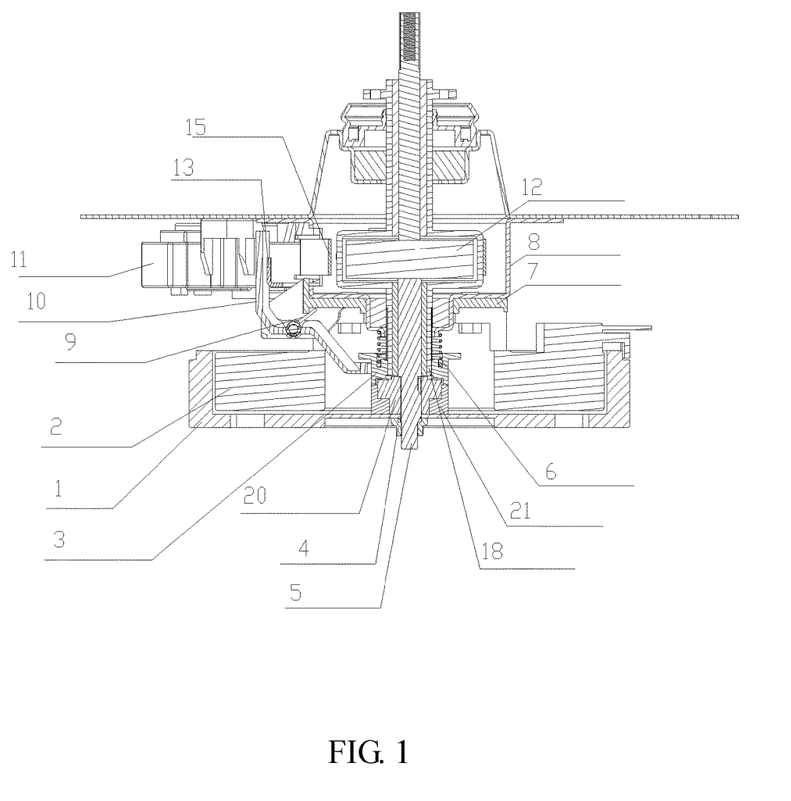
FIG. 1 is a schematic structural diagram of a cross section according to the present invention.
Figure 2:
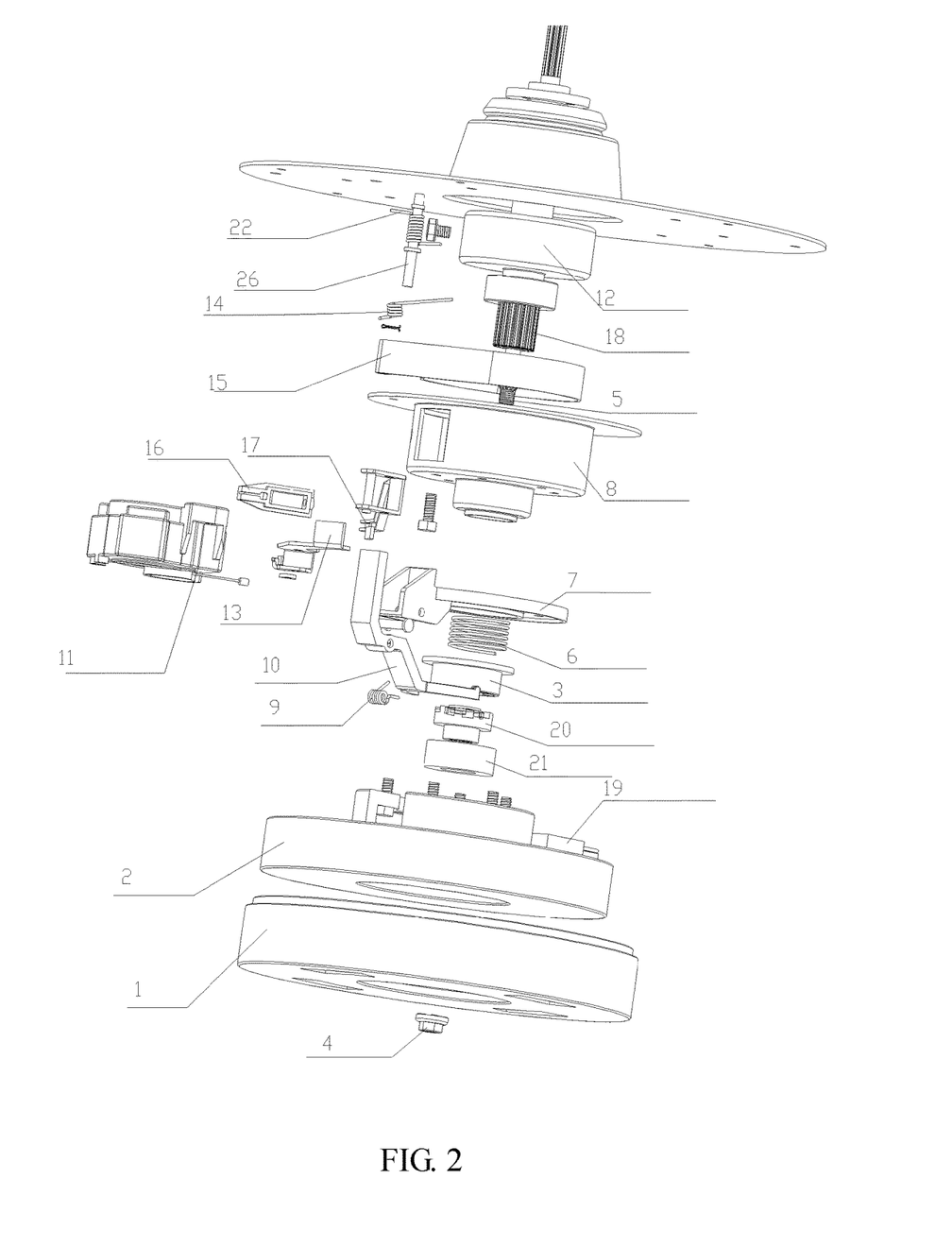
FIG. 2 is an exploded view of a structure according to the present invention.
Figure 3:
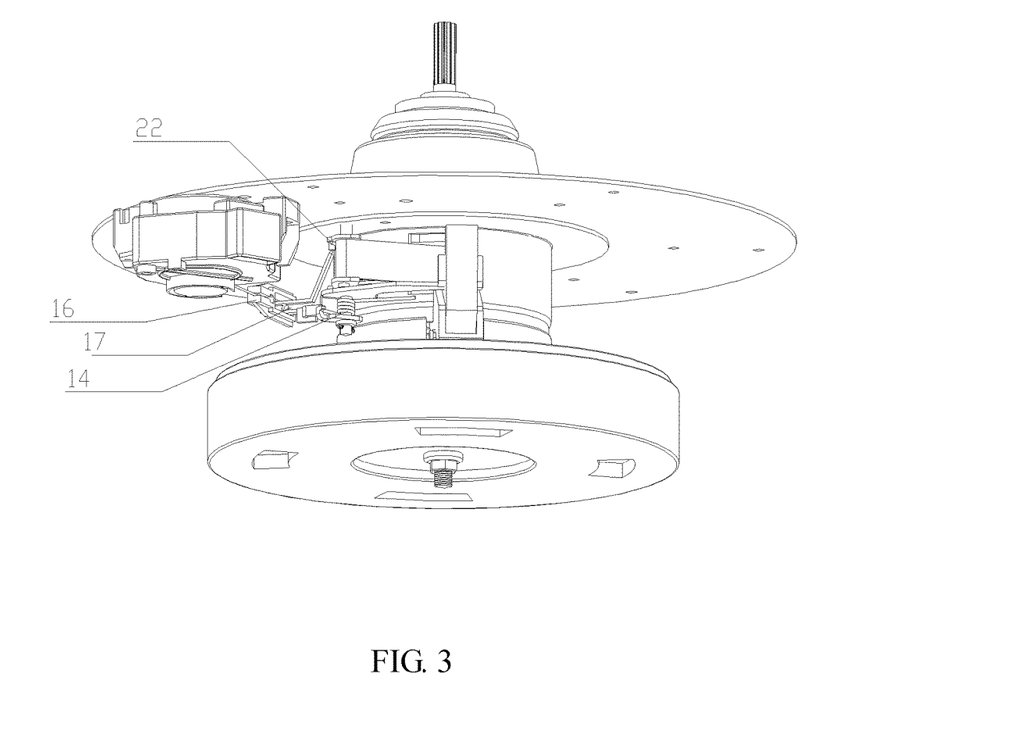
FIG. 3 is a schematic structural diagram according to the present invention.

As shown in FIG. 1 and FIG. 2, in this embodiment, a frequency-variable hand rubbed-type motor speed reduction clutch apparatus is introduced and includes: an input shaft 5, and a motor rotor 1 fixedly connected to the input shaft 5, where a dehydration shaft sleeve 20 rotates together with the input shaft 5 is installed on the input shaft 5, and the dehydration shaft sleeve 20 is engaged with or disengaged from the input shaft 5 by means of a clutch shaft sleeve 3 sliding up and down; a braking wheel 12 is connected to a dehydration shaft 18; under the action of a control apparatus, a traction motor 11 generates a displacement to tract a braking belt 15 to change from grasping the braking wheel 12 to loosening the braking wheel 12; and the traction motor 11 generates a displacement again so that the clutch shaft sleeve 3 changes from being disengaged from to engaged with the input shaft 5.

In this embodiment, the motor is formed by a rotor 1 connected to the input shaft 5 and a motor of an outer rotor 1 formed by a stator 2 fixed on a clutch apparatus housing 8. The clutch shaft sleeve 3 sliding up and down is installed on the dehydration shaft 18; when the clutch shaft sleeve 3 descends, the clutch shaft sleeve 3 is engaged with the dehydration shaft sleeve 20, so that the rotor 1 drives, by means of the clutch shaft sleeve 3, the dehydration shaft 18 to rotate; when the clutch shaft sleeve 3 ascends, the clutch shaft sleeve 3 is disengaged from the dehydration shaft sleeve 20, and the dehydration shaft 18 is fixed to the clutch apparatus housing 8 by means of the clutch shaft sleeve 3; and the traction motor 11 controls, by means of the control apparatus, the clutch shaft sleeve 3 to slide up and down.

Figure 4:
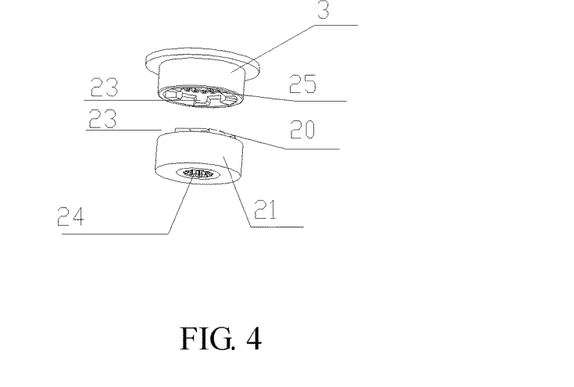
FIG. 4 is a schematic structural diagram of a clutch shaft sleeve and a dehydration shaft sleeve according to the present invention.

As shown in FIG. 4, in this embodiment, the dehydration shaft sleeve 20 is formed by two segments of shaft sleeves that are coaxial and have different diameters, and whose central installation through-holes are provided with second inner splines 25 fitted to the input shaft 5. The upper-segment shaft sleeve is relatively small in outer diameter, and passes through an inner hole of the clutch shaft sleeve 3 and then contacts an end portion of the dehydration shaft 18. The lower-segment shaft sleeve is relatively large in outer diameter, and an upper end of the lower-segment shaft sleeve is provided with spline teeth fitted to the clutch shaft sleeve 3, so as to be engaged with or disengaged from the clutch shaft sleeve 3. The dehydration shaft sleeve 20 is sleeved over the input shaft 5, and the dehydration shaft sleeve 20 is connected to the input shaft 5 by means of fixedly engaged splines. One end of the dehydration shaft sleeve 20 and one end of the clutch shaft sleeve 3 are provided with fitted spline teeth 23, so that the dehydration shaft sleeve 20 and the clutch shaft sleeve 3 are fixed or disengaged. The clutch shaft sleeve 3 is sleeved over the dehydration shaft 18, and the dehydration shaft 18 is connected to the clutch shaft sleeve 3 by means of fixedly engaged splines.

In this embodiment, the clutch shaft sleeve 3 is formed by a shaft sleeve whose central inner hole is provided with first inner splines 24 fitted to the dehydration shaft 18. A circle of fixed protrusion horizontally extends outward from the external periphery of the shaft sleeve. A clutch spring 6 having a tensioned force is disposed between the fixed protrusion and the fixing bracket 7. A lower end portion of the clutch shaft sleeve 3 is axially provided with spline teeth fitted to the dehydration shaft sleeve 20. The clutch shaft sleeve 3 is connected to the traction motor 11 by means of the control apparatus. Therefore, the clutch shaft sleeve 3 slides up and down under the action of the traction motor 11, so that the clutch shaft sleeve 3 switches between an upper location and a lower location.

In this embodiment, spline teeth engaged with the dehydration shaft sleeve 20 are disposed at one end of the clutch shaft sleeve 3. An end at which the dehydration shaft sleeve 20 is in contact with the clutch shaft sleeve 3 is also provided with spline teeth fitted to the clutch shaft sleeve 3.

In this embodiment, the clutch shaft sleeve 3 and the dehydration shaft sleeve 20 are respectively sleeved over the dehydration shaft 18 and the input shaft 5, and the first inner splines 24 are disposed on the clutch shaft sleeve 3, so that the clutch shaft sleeve 3 is axially fixed to the dehydration shaft 18 by means of splines, and the clutch shaft sleeve 3 may drive the dehydration shaft 18 to rotate together. The second inner splines 25 are disposed on the dehydration shaft sleeve 20, so that the dehydration shaft sleeve 20 is axially fixed to the input shaft 5 by means of splines, and the input shaft 5 may drive the dehydration shaft sleeve 20 to rotate together.

In this embodiment, a shock absorption pad 21 is installed on the external periphery of the dehydration shaft sleeve 20, and the shock absorption pad 21 is made of a buffering material such as rubber, so as to reduce a vibration impact on the clutch apparatus caused by an abnormal sound generated in a process in which the clutch shaft sleeve 3 is engaged with the dehydration shaft sleeve 20 and in a process in which the motor rotor 1 rotates.

In this embodiment, the fixing bracket 7, the clutch spring 6, the clutch shaft sleeve 3, the dehydration shaft sleeve 20, the motor stator 2 and the motor rotor 1 are sequentially sleeved over the input shaft, and are installed between a nut 4 and the housing 8 by using the nut 4 connected to an end portion of the input shaft 5.

In this embodiment, the motor stator 2 is fixedly installed on a lower housing of the clutch apparatus housing 8, and the upper edge of the outer end of the stator 2 is further provided with a Hall sensor 19. By using data detected by the Hall sensor 19, the washing machine may determine the rotation speed of the rotor 1.

Embodiment 2

As shown in FIG. 1 and FIG. 2, in this embodiment, a specific connection structure of the control apparatus of the clutch apparatus is as follows: one end of the connection arm 16 is provided with an installation slot fixedly connected to a displacement output end of the traction motor 11, and another end of the connection arm 16 is formed by a square through-hole; and the braking arm 17 is installed in the square through-hole. The braking arm 17 is installed at a lower portion of an installation pin 26 and rotates around the installation pin 26, and the installation pin 26 is disposed on the housing 8; and one end of the braking arm 17 is connected to the connection arm 16, another end of the braking arm 17 is used as the first output end fixedly connected to the braking belt 15, and the second output end in contact with or disengaged from the compression bar 13 is further disposed on the braking arm 17. The compression bar 13 is installed at an upper portion of the installation pin 26 and rotates around the installation pin 26. One end of the compression bar 13 is in contact with or disengaged from the braking arm 17, and another end of the compression bar 13 is in contact with the shifting fork 10. The shifting fork 10 is installed on the housing 8 in a vertically rotatable manner. One end of the shifting fork 10 is provided with a blocking fork that limits sliding of the clutch shaft sleeve 3, and another end of the shifting fork 10 is provided with a blocking handle in limited contact with the compression bar 13.

In this embodiment, one end of the connection arm 16 is connected to the traction motor 11, and another end of the connection arm 16 is fixedly connected to the braking arm 17. The braking arm 17 is controllably in contact with or disengaged from the compression bar 13 by a gap, and the compression bar 13 is in limited contact with the shifting fork 10. The compression bar 13 or the braking arm 17 is separately installed to a lower portion or an upper portion of the installation pin 26 of the clutch apparatus housing 8 by means of a third torsional spring 22 or a second torsional spring 14. Under the action of the traction motor 11, the connection arm 16 generates a horizontal displacement, and drives the braking arm 17 to move, so that the braking belt 15 is disengaged from the braking wheel 12, and the compression bar 13 contacts the braking arm 17. Under the action of the traction motor 11, the connection arm 16 generates a second displacement in a same horizontal direction, and drives the braking arm 17 to move, so as to extrude the compression bar 13 to move together with the braking arm 17, and cancel a limiting function of the compression bar 13 on the shifting fork. Therefore, the clutch shaft sleeve 3 moves downward under the action of the clutch spring and is engaged with the dehydration shaft sleeve.

Moreover, when the traction motor 11 does not act on the connection arm 16, the compression bar 13 restores to an initial location under the action of the second torsional spring 14, and the braking arm restores to an initial location under the action of the third torsional spring 22, so as to drive the braking belt to lock the braking wheel. Moreover, the shifting fork restores to an initial location under the action of a first torsional spring, and drives the clutch shaft sleeve to overcome an acting force of the clutch spring to move upward, so as to be disengaged from the dehydration shaft sleeve.

The controllable traction acting force of the traction motor 11 is transferred to the clutch shaft sleeve 3 by using the control apparatus, thereby implementing up-and-down sliding of the clutch shaft sleeve 3 and fitted actions between the braking belt 15 and the braking wheel 12 such as grasping and disengagement, so as to achieve an objective that under the action of the clutch shaft sleeve 3 and the braking belt 15, the dehydration shaft 18 rotates jointly together with the rotor 1 or freely rotates or grasps and does not move.

In this embodiment, the braking arm 17 includes a strip bar and a square installation hole provided at an end portion of the braking arm 17, and the strip bar is connected to the braking arm 17, so as to generate a displacement under the action of the braking arm 17. A side wall of the square installation hole is perpendicularly connected to the strip bar, and another side wall opposite to the side wall is formed by a casing pipe. The braking arm 17 may be installed on the installation pin 26 in a rotatable manner by using the side wall formed by the casing pipe. A tensioned third torsional spring 22 is disposed between the braking arm 17 and the installation pin 26, so as to provide a reset acting force for the braking arm 17. An end portion of the braking belt 15 goes to the back of the side wall formed by the casing pipe, threads into a square installation through-hole, and is locked and fixed on the side wall of the opposite side, so that the braking belt 15 and the braking arm 17 are fixedly installed, and the square through-hole is used as a first output end. A middle location of the strip bar is provided with a contact screw in contact with or disengaged from the compression bar 13, and an end portion of the contact screw has a distance from a contact end of the compression bar 13, where the distance may be adjusted according to needs, so that after the braking arm 17 generates a first displacement under the action of the traction motor 11, the contact screw approaches but does not contact the compression bar 13.

In this embodiment, an installation hole for the compression bar 13 to be installed on the installation pin 26, and a first blocking sheet and a second blocking sheet that are disposed at two sides of the compression bar 13 and perpendicular to the compression bar 13 are provided on the compression bar 13. There is a gap between the first blocking sheet and the contact screw of the braking arm 17, and the second blocking sheet is in contact with the shifting fork 10. A tensioned second torsional spring 14 is disposed between the compression bar 13 and the installation pin 26, so as to provide a reset acting force for the compression bar 13.

In this embodiment, the shifting fork 10 may be installed on a fixing bracket 7 and vertically rotate around the fixing bracket 7. The fixing bracket 7 is sleeved over the dehydration shaft, and fixedly installed on the housing 8. The shifting fork 10 is perpendicular to the fixing bracket 7, and may be installed on the fixing bracket 7 and rotate around the fixing bracket 7. One end of the shifting fork 10 is provided with a blocking fork that limits downward sliding of the clutch shaft sleeve 3, and opposite another end of the shifting fork 10 is provided with a blocking handle in fitted contact with a second blocking sheet of the compression bar 13. A tensioned first torsional spring 9 is disposed between the shifting fork 10 and the fixing bracket 7, so as to provide a reset acting force for the shifting fork 10.

In this embodiment, a clutch spring 6 having a tensioned force is disposed between the clutch shaft sleeve 3 and the fixing bracket 7 that are sleeved over the dehydration shaft 18. The clutch spring 6 is sleeved over the dehydration shaft 18, one end of the clutch spring is in contact with the fixing bracket 7, and another end of the clutch spring is in contact with the fixed protrusion of the clutch shaft sleeve 3.

The control apparatus formed by the connection arm, the braking arm, the shifting fork and the clutch spring transfer a controllable traction acting force of the traction motor to the clutch shaft sleeve or the braking belt, so as to implement a fitted action between the clutch shaft sleeve and the braking belt, and achieve an objective that under the action of the clutch shaft sleeve and the braking belt, the dehydration shaft rotates jointly together with the rotor or freely rotates or grasps and does not move.

Embodiment 3

This embodiment introduces a method for controlling a frequency-variable hand rubbed-type motor speed reduction clutch apparatus, where the method includes: driving, by a traction motor, a connection arm to generate a first displacement, so that a braking belt is disengaged from a braking wheel on a dehydration shaft, and the dehydration shaft can freely rotate; and driving the connection arm to generate a second displacement, so that a clutch shaft sleeve is engaged with a dehydration shaft sleeve, and the dehydration shaft rotates together with an input shaft.

The frequency-variable hand rubbed-type motor speed reduction clutch apparatus includes three states: a first state, where the braking belt grasps the braking wheel, and the dehydration shaft sleeve is disengaged from the clutch shaft sleeve; in this case, the input shaft may rotate together with a rotor of the motor, and the dehydration shaft is locked tightly and cannot rotate;

a second state, where the braking belt loosens the braking wheel, and the dehydration shaft sleeve is disengaged from the clutch shaft sleeve; in this case, the input shaft may rotate together with a rotor of the motor, and the dehydration shaft is in a free state; and a third state, where the braking belt loosens the braking wheel, and the dehydration shaft sleeve is engaged with the clutch shaft sleeve; in this case, the input shaft may rotate together with a rotor of the motor, and under the driving of the input shaft, the dehydration shaft may also rotate together with the motor rotor.

In this embodiment, the traction motor drives the connection arm to generate the first displacement, and the clutch apparatus changes from the first state to the second state; and after the traction motor drives the connection arm to generate the second displacement, and the clutch apparatus changes from the second state to the third state. Then when the displacement function of the traction motor is cancelled, under the action of a reset torsional spring, the clutch apparatus restores to the first state.

Embodiment 4

This embodiment introduces a washing machine in which a frequency-variable hand rubbed-type motor speed reduction clutch apparatus is installed, where the washing machine includes: an outer bucket and an inner bucket that are installed in a body and an impeller that is disposed in the inner bucket, where the clutch apparatus is fixedly installed on the washing machine, the input shaft is fixedly connected to the impeller of the washing machine by using a speed reduction component inside the speed reduction clutch apparatus, and the dehydration shaft is fixedly connected to the inner bucket of the washing machine.

In this embodiment, the clutch apparatus is connected to a traction motor, and a synchronous motor is used as the traction motor. When the washing machine does not work, the braking belt grasps the braking wheel, the dehydration shaft cannot rotate, and the inner bucket of the washing machine cannot rotate. During washing, the traction motor generates a displacement, and drives the braking belt to be disengaged from the braking wheel, so that the input shaft rotates together with the motor rotor, so as to drive the impeller connected to the input shaft to rotate, and the inner bucket generates inertial rotation together with rotation of the impeller. During dehydration, the traction motor generates a displacement in a same direction again, and drives the clutch shaft sleeve to be engaged with the dehydration shaft sleeve, so that the input shaft and the dehydration shaft both rotate together with the motor rotor, so as to drive the impeller connected to the input shaft and the inner bucket connected to the dehydration shaft to simultaneously rotate together with the rotor of the motor.

In the present invention, the clutch shaft sleeve and the clutch spring are installed in space inside the motor, and compared with the conventional clutch formed by components such as a ratchet wheel, a clutch spring, and a shaft sleeve, the present invention is smaller in volume, and more in compact in installation structure, the height of the motor speed reduction clutch is effectively reduced, and the whole washing capacity of the washing machine may be effectively increased.

Implementation solutions in the foregoing embodiments may be further combined or replaced, and the embodiments are described only for preferable embodiments of the present invention, and do not limit the conception and scope of the present invention. On the premise of not departing from the design idea of the present invention, various changes and improvements made in the technical solutions of the present invention by persons skilled in the art all fall within the protection scope of the present invention.

What is claimed is:

1. A frequency-variable hand rubbed-type motor speed reduction clutch apparatus, comprising:
    an input shaft (5) connected to a motor rotor (1);
    a dehydration shaft (18); and
    a clutch apparatus housing (8) in which the input shaft (5) and the dehydration shaft (18) are installed,
    wherein a braking wheel (12) and a braking belt (15) fitted to the braking wheel are disposed on the dehydration shaft (18);
    wherein a dehydration shaft sleeve (20) rotating together with the input shaft (5) is installed on the input shaft (5), and a clutch shaft sleeve (3) sliding up and down and engaged with or disengaged from the dehydration shaft sleeve (20) is installed on the dehydration shaft (18);
    wherein the braking belt (15) and the clutch shaft sleeve (3) are separately connected to a traction motor (11) by means of a control apparatus;
    wherein the traction motor (11) generates a first displacement, the first displacement is transmitted by means of the control apparatus and drives the braking belt (15) to move, so that the braking belt (15) changes from grasping the braking wheel (12) to loosening the braking wheel (12), and the dehydration shaft (18) changes from a braked state to a free rotation state; and
    wherein the traction motor (11) generates a second displacement, the second displacement is transmitted by means of the control apparatus and drives the clutch shaft sleeve (3) to move, so that the clutch shaft sleeve (3) changes from being disengaged from the dehydration shaft sleeve (20) to engaged with the dehydration shaft sleeve (20), and the dehydration shaft (18) rotates together with the input shaft (5).

2. The frequency-variable hand rubbed-type motor speed reduction clutch apparatus according to claim 1,
    wherein the control apparatus comprises a traction mechanism connected to the traction motor (11), and a shifting fork mechanism in contact with the clutch shaft sleeve; and
    wherein a first output end of the traction mechanism is connected to the braking belt (15), and a second output end of the traction mechanism is connected to the shifting fork mechanism, so as to drive the clutch shaft sleeve (3) to move up and down.

3. The frequency-variable hand rubbed-type motor speed reduction clutch apparatus according to claim 2,
    wherein the traction mechanism comprises a connection arm (16) and a braking arm (17);
    wherein the connection arm (16) is connected to the traction motor (11) to transmit control power, and the connection arm (16) is connected to the braking belt (15) by means of a first output end of the braking arm (17); and
    wherein the connection arm (16) is connected to the shifting fork mechanism by means of a second output end of the braking arm (17).

4. The frequency-variable hand rubbed-type motor speed reduction clutch apparatus according to claim 3, wherein the shifting fork mechanism comprises a compression bar (13) connected to the second output end of the braking arm, and a shifting fork (10) in limited contact with the compression bar (13); and the shifting fork (10) is in contact with the clutch shaft sleeve (3), so as to control the clutch shaft sleeve (3) to move up and down.

5. The frequency-variable hand rubbed-type motor speed reduction clutch apparatus according to claim 4, wherein the braking arm (17) is installed at a lower portion of an installation pin (26) and rotates around the installation pin (26), and the installation pin (26) is disposed on the housing (8); and one end of the braking arm (17) is connected to the connection arm (16), another end of the braking arm (17) is used as the first output end fixedly connected to the braking belt (15), and the second output end in contact with or disengaged from the compression bar (13) is further disposed on the braking arm (17).

6. The frequency-variable hand rubbed-type motor speed reduction clutch apparatus according to claim 5, wherein the compression bar (13) is installed at an upper portion of the installation pin (26) and rotates around the installation pin (26); and one end of the compression bar (13) is in contact with or disengaged from the braking arm (17), and another end of the compression bar (13) is in contact with the shifting fork (10).

7. The frequency-variable hand rubbed-type motor speed reduction clutch apparatus according to claim 6, wherein the shifting fork (10) is installed on the housing (8) in a vertically rotatable manner; and one end of the shifting fork (10) is provided with a blocking fork that limits sliding of the clutch shaft sleeve (3), and another end of the shifting fork (10) is provided with a blocking handle in limited contact with the compression bar (13).

8. The frequency-variable hand rubbed-type motor speed reduction clutch apparatus according to claim 6, wherein the shifting fork (10), the compression bar (13), and the braking arm (17) are separately connected to corresponding torsional springs providing reset acting forces for the shifting fork (10), the compression bar (13), and the braking arm (17); and
    wherein the clutch shaft sleeve (3) is in contact with a clutch spring (6) providing a downward movement acting force for the clutch shaft sleeve (3).

9. The frequency-variable hand rubbed-type motor speed reduction clutch apparatus according to claim 3, wherein one end of the connection arm (16) is provided with an installation slot fixedly connected to a displacement output end of the traction motor (11), and another end of the connection arm (16) is formed by a square through-hole; and the braking arm (17) is installed in the square through-hole.

10. The frequency-variable hand rubbed-type motor speed reduction clutch apparatus according to claim 1, wherein the clutch shaft sleeve (3) is sleeved over the dehydration shaft (18), and the dehydration shaft (18) is connected to the clutch shaft sleeve (3) by means of engaged splines.

11. The frequency-variable hand rubbed-type motor speed reduction clutch apparatus according to claim 10, wherein one end of the clutch shaft sleeve (3) and one end of the dehydration shaft sleeve (20) are separately provided with fitted spline teeth, so that the dehydration shaft sleeve (20) and the clutch shaft sleeve (3) are engaged and connected or disengaged.

12. The frequency-variable hand rubbed-type motor speed reduction clutch apparatus according to claim 1, wherein the dehydration shaft sleeve (20) is sleeved over the input shaft (5), and the dehydration shaft sleeve (20) is connected to the input shaft (5) by means of engaged splines.

13. A washing machine in which the frequency-variable hand rubbed-type motor speed reduction clutch apparatus according to claim 1 is installed.

\* \* \* \* \*